Patented May 6, 1941

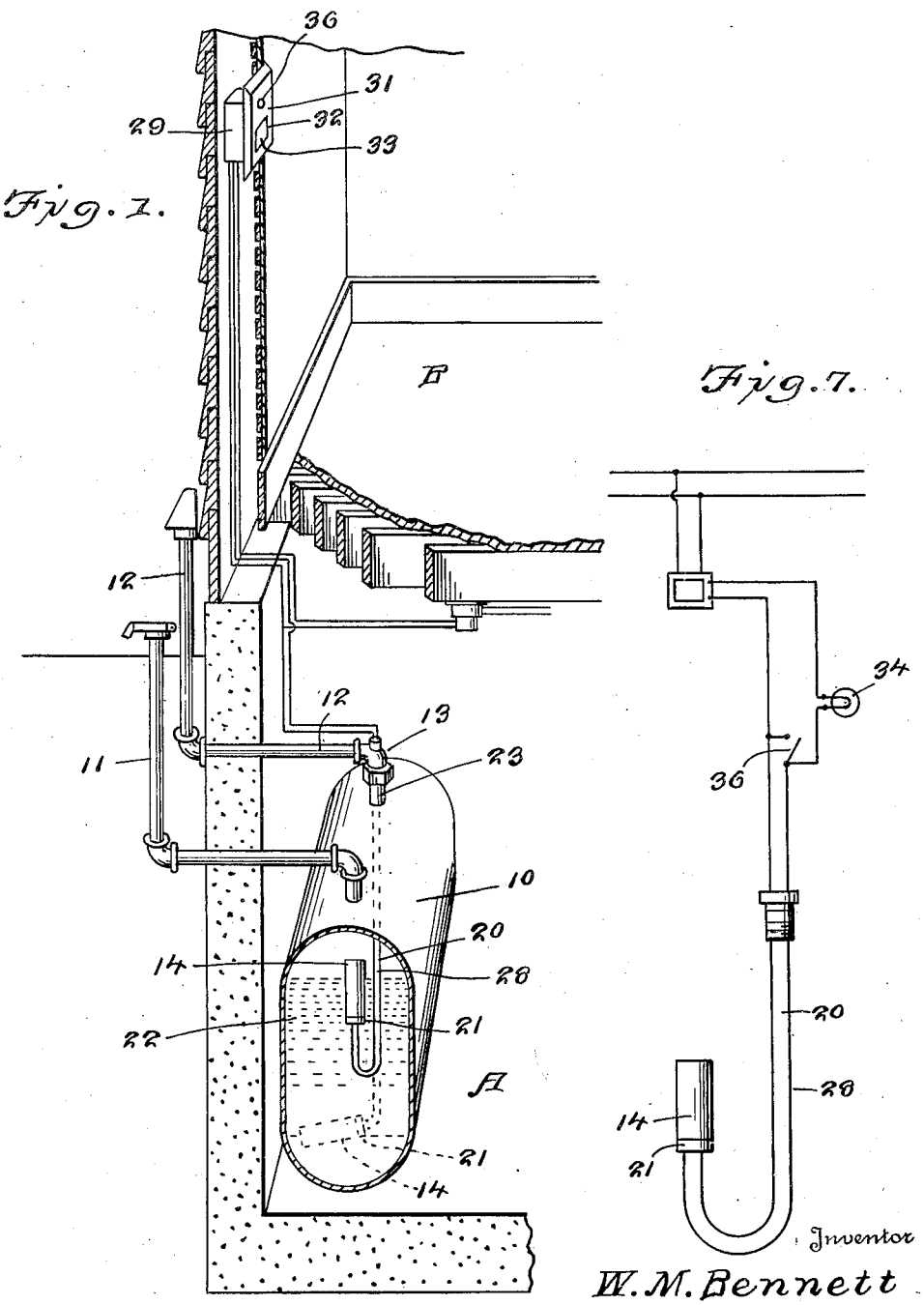

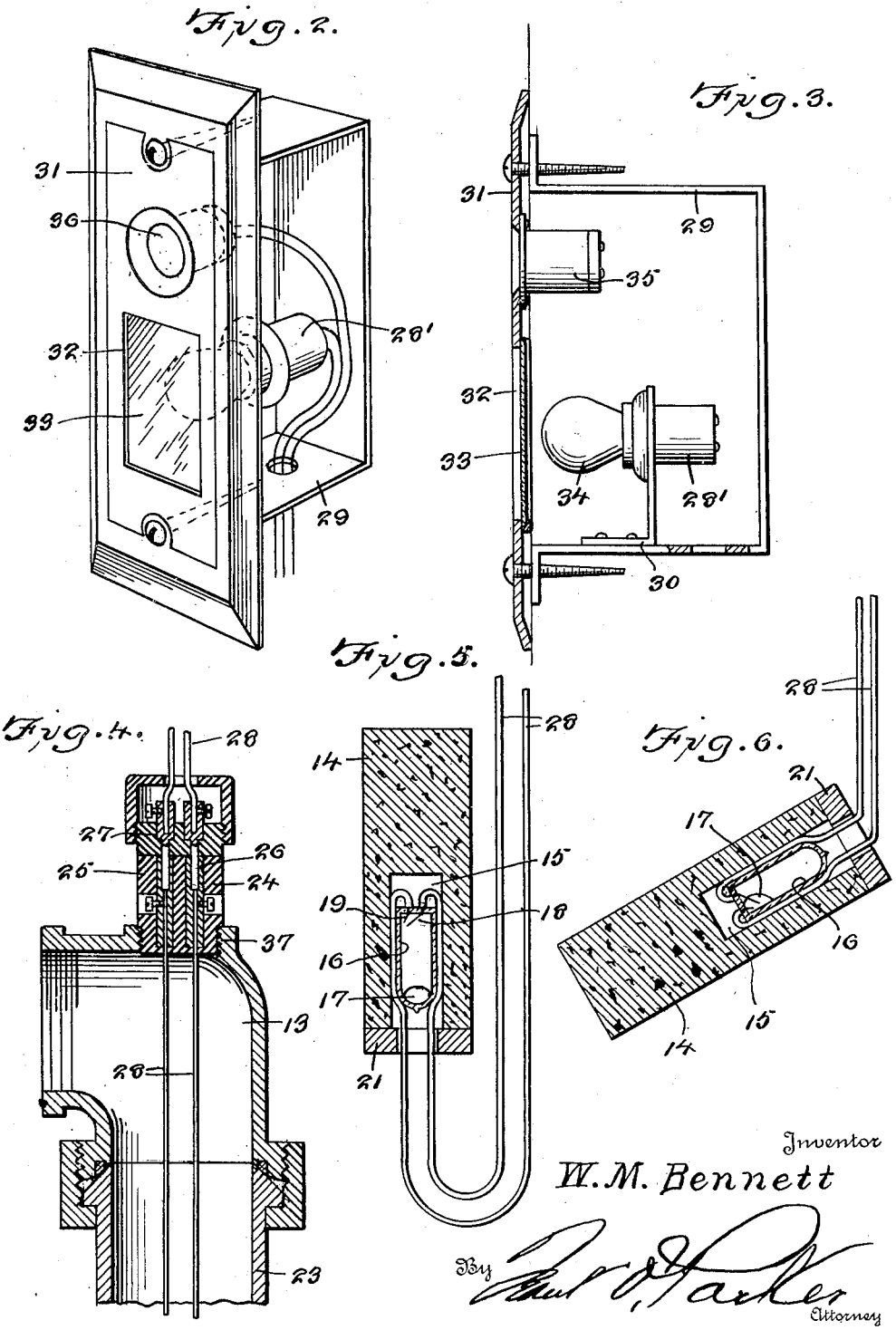

2,240,880

UNITED STATES PATENT OFFICE 2,240,880

FLOAT SWITCH CONTROL SIGNALING DEVICE

William M. Bennett, Omaha, Nebr.

Application September 20, 1938, Serial No. 230,888

4 Claims. (Cl. 200—84)

The invention relates to an electric signal switch and more especially to a combined float and signal switch for use in liquid containers, for example, oil tanks for servicing oil burners in domestic use.

The primary object of the invention is the provision of a device of this character wherein a buoyant element is loosely suspended within a liquid container for floating action and has therein an automatic switch of the mercury type so that this buoyant element when the contents of the tank falls to a determined level the switch closes and by a circuit, low voltage from a door bell transformer or dry cell batteries, a visible signal is discernible, thereby giving notice of the quantity of the contents within the tank or in other words, giving notification that the liquid has fallen to a determined level within said tank, the mounting of the float with the switch incorporated therein being of novel construction.

Another object of the invention is the provision of a device of this character wherein an electric signal switch for showing depth of liquid within a tank, for example, oil, is inserted and sealed in one end of a float element, preferably of the cork type and of hollow design, the float being suspended through flexible wires or leads which in their arrangement will allow regulation of the distance of the float from the top of the tank and such wires or leads are susceptible of adjustment, the float being controlled by the level of the liquid within the tank, and on the closing of the switch when the liquid falls to a determined level will establish a visible signal and in this way notifying a person of such low condition of liquid remaining within the tank, the signal being arranged at a convenient locality within an edifice and thus avoiding the necessity of a person going to the tank and making measurement of its contents.

A further object of the invention is the provision of a device of this character wherein the float of a buoyant kind is arranged in an upright position due to a counter-weight attached to one end thereof and this position is sustained until a predetermined level of liquid is reached within a container therefore so that when the float assumes a horizontal position an electric switch automatically closes, the switch being confined within the float and operates a (6 C. P.—2 volt) signal lamp thereby establishing a warning of the amount of liquid content remaining in the tank and thus this signal signifies the necessity for replenishing the tank with liquid, and when the tank is refilled whereupon the float again resumes its upright position and the electric circuit to the signal is open or the signal shut off.

A still further object of the invention is the provision of a device of this character which is extremely simple in its construction, thoroughly reliable and efficient in operation, possessed of accuracy in operation thereof, being susceptible of easy adjustment so that the float may be arranged at any depth within the tank, this arrangement being taken care of by the length of the flexible wires within the electric circuit to the said switch, no sparking being had during its operation, and inexpensive to manufacture and install.

With these and other objects in view, the invention consists in the features of construction, combination, and arrangement of parts as will be hereinafter more fully described in detail, illustrated in the accompanying drawings, which disclose the preferred embodiment of the invention and pointed out in the claims hereunto appended.

In the accompanying drawings:

Figure 1 is a fragmentary perspective view partly in section of a building showing an oil tank arranged in a system for supplying an oil burner and having the device constructed in accordance with the invention associated therewith.

Figure 2 is a perspective view of a signaling device for association with the device.

Figure 3 is a vertical longitudinal sectional view thereof.

Figure 4 is an enlarged detailed vertical sectional view through the separable fitting within an electric circuit for the float carrying switch of the device.

Figure 5 is a vertical longitudinal sectional view through the float and arranged in a vertical position.

Figure 6 is a view similar to Figure 5 showing the float in a changed position, the latter being the closing position for the switch, while in Figure 5 is the opening position for the switch.

Figure 7 is a diagrammatic plan view of the switch the signal and the circuit therebetween.

Similar reference characters indicate corresponding parts throughout the several views in the drawings.

Referring to the drawings in detail, A designates generally a portion of a cellar of a building and B a portion of a room of such building above the cellar. Within the cellar A is located as is customary, an oil tank 10 of an oil system for an oil burner for domestic heating of the building, the said tank being supplied with fuel oil forming a lead in pipe 11 which is accessible from without the building while 12 denotes an air vent pipe extending from without the building to within the tank and includes an elbow joint 13 outside of the tank 10 and slightly above the same.

The device constituting the present invention comprises a cork float body 14 preferably of elongated and of circular formation in cross section, having in one end a pocket or recess 15, being centrally located and opens through one end of said body. This pocket 15 accommodates a mercurial tube 16 having a small amount of mercury 17 therein forming a tear or drop while at the innermost end of this tube 16 and extended within the same are the switch contacts 18 and 19 respectively, having joined therewith the wires respectively of a low voltage electric circuit 20 which are carried through a clearance in a counter-weight 21 fitted to the float body 14 at the end next to the pocket 15 for the tube 16 and this weight when the float is within the tank 10 and buoyantly supported on the liquid 22 therein will hold the said float body 14 in a vertical or upright position as is clearly shown in Figures 1 and 5 of the drawings. In this upright position of the body 14 with the weight 21 lowermost thereof, the mercury 17 is remote from the contacts 18 and 19 so that the switch constituted by these contacts and the mercury will be open and the circuit 20 likewise open.

The wires 20 are passed upwardly through the vertical portion 23 of the vent pipe 12 and determined lengths of these wires are severed from the companion wires of the circuit 20, which severed determined length wires are separably attached to contacts 24 of a two-part separable connector, one part being a female part 25 and the other a male part 26 respectively. The male part being provided with contact fingers 27 and these are separably connected to the other or remaining severed portions of the wires of the circuit 20. The lengths of the wires 28 of the circuit 20 joined with the contacts 18 and 19 and the female member 25 of the separable connector determines the depth of suspension of the float body 14 within the tank 10 so that when the level of the liquid 22 within the tank 10 drops to a determined degree or point, the mercury 17 flows in a direction to engage the contacts 18 and 19 and this comes about by the inverting from an upright position to the position shown in Figure 6 of the float body 14 and thus the circuit 20 closes for the operation of a signal hereinafter fully described.

Included in the circuit 20 is an electric bulb socket 28' being arranged within a box 29, preferably supported by a bracket 30 therein. This box has a front plate 31 provided with a window 32 covered by a transparent panel 33 generally bearing suitable inscription, as for example, the number of a domestic oil deliverer, the inscription being had by a rubber stamp or a red Celluloid window. The window 32 has confronting the same from the rear thereof, the socket 28 and in which is fitted an electric light bulb 34, while this circuit 20 also includes a push button switch 35 being mounted in the front plate 31 of the box 29. The button 36 of this switch 35 is accessible from without said box. The light bulb 34 continues to burn from the time the float becomes inverted from upright position until the oil is replenished in the tank. When the float assumes substantially a vertical position the circuit to the light bulb is off. This visible signal is only used to test the wiring circuit to make sure that the bulb 34 will light and thereby prove that the circuit from the transformer to the said bulb is not dead.

The box 29 which is the lamp house for the signal is adapted to be built within the wall of the room B which may be a kitchen or other room above the cellar A and in this way relieving a person from going to the cellar to ascertain the quantity of oil within the tank 10.

The float body 14 is flexibly suspended by the wires 28 within the tank 10 requiring no fixtures other than said wires and the connector including the female member 25 which is tapped into the upper portion of the elbow joint 13 being screw threaded at 37 for the separable fastening of the said female member 25 to the joint 13.

The signal may be located at any desirable point within the building or without the same and the float body 14 being free and in suspension by the wires 28 within the tank assures freedom of action and accuracy in enabling the determination of the liquid level within said tank, the signaling being had only when this liquid 22 drops within the tank to a determined low level. The liquid when at a high level sustains the float by reason of the weight 21 associated therewith in a substantially upright or vertical position and such float becomes inverted on the lowering of the liquid level within the tank A so that the switch within this float will automatically operate for the purposes hereinbefore stated.

What is claimed is:

1. A device of the kind described, comprising a buoyant body having a weighted end for holding said body vertically when afloat, free universally flexible suspension means connected to the weighted end of the body for upsetting the same when directly suspended by the suspension means, and a gravity acting circuit closer within the body at the weighted end, for opening a circuit when the body is vertically disposed and automatically closing said circuit on the upsetting of said body.

2. A device of the kind described, comprising a buoyant elongated body having a socket only in one end thereof, a weight on the body at the socketed end for holding said body upright with the socketed end lowermost thereof when afloat, a circuit closing gravity actuated means confined in the socketed end and having its parts arranged for maintaining a circuit open when socketed end is lowermost of the body and automatically working for closing the circuit upon upsetting the said body and concurrent change of position of the socketed end, and a free universally flexible suspension member having connection at the weighted end of the body with the said means for upsetting said body when suspended by said suspension means.

3. A device of the kind described, comprising a buoyant body, a gravity actuated electric circuit closing device confined within the body adjacent one end thereof, and a fixed weight built with the body next to the closing device for holding said body upright when fully afloat and also concurrently maintaining the closing device away from a circuit closing position.

4. A device of the kind described, comprising an elongated buoyant body, a weight at one end of the body for holding it vertically when floating in a quantity of liquid, suspension means located at the weighted end of the body for upsetting the latter when under suspension by said suspension means, and gravity acting circuit closing means within the body and movable to circuit closing position when the body is under suspension by said suspension means in upset position.

WILLIAM M. BENNETT.